Jan. 6, 1953
L. T. PRITCHARD
2,624,488
COVER FOR HIGH-PRESSURE VESSELS
Filed Nov. 7, 1947
2 SHEETS—SHEET 1
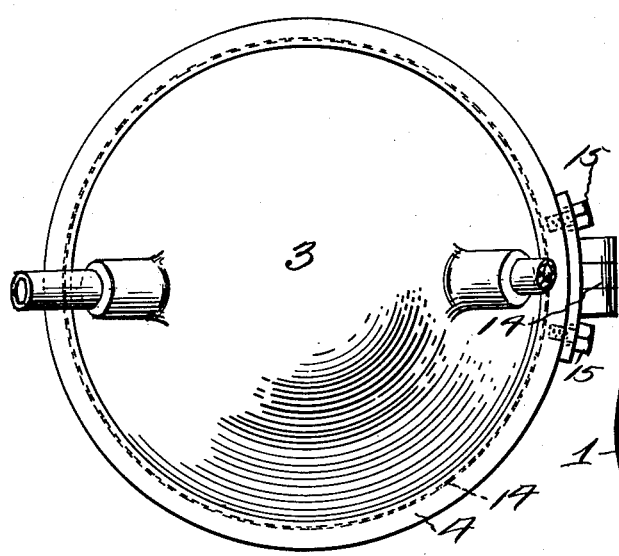
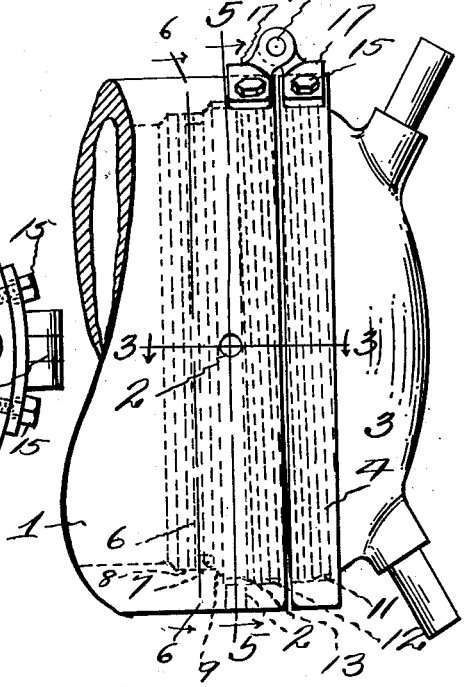
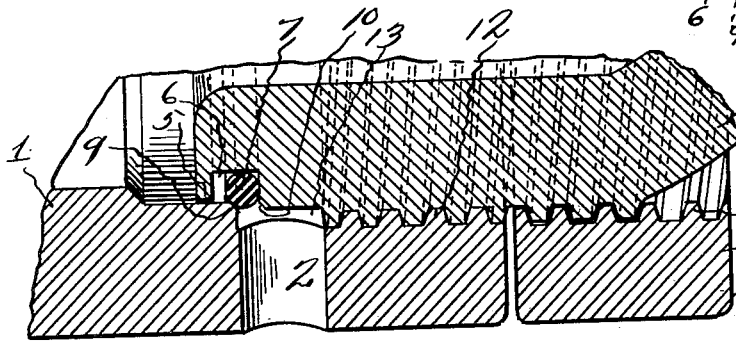
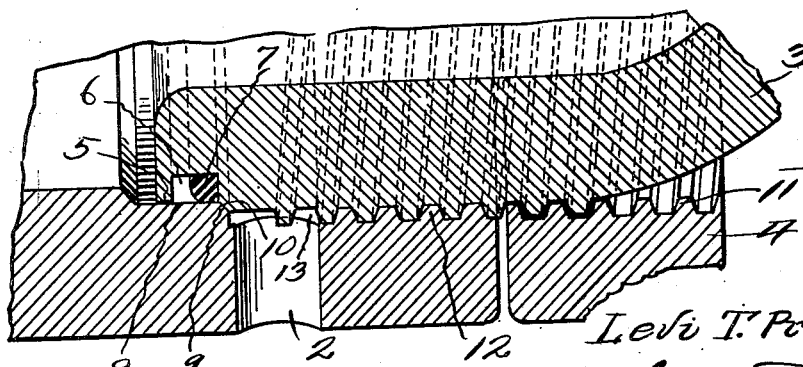
Inventor
Levi T. Pritchard
By Philip A. H. Terrell
Attorney Jan. 6, 1953 L. T. PRITCHARD 2,624,488
COVER FOR HIGH-PRESSURE VESSELS
Filed Nov. 7, 1947 2 SHEETS—SHEET 2
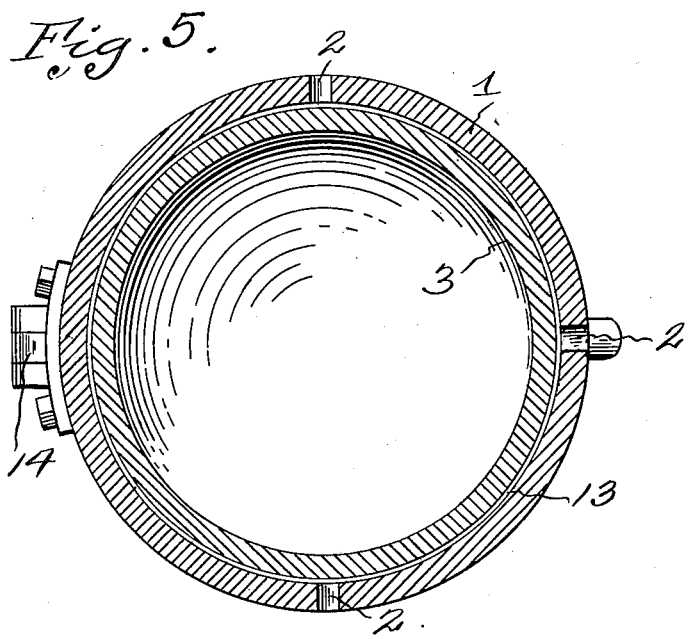
Fig. 5.
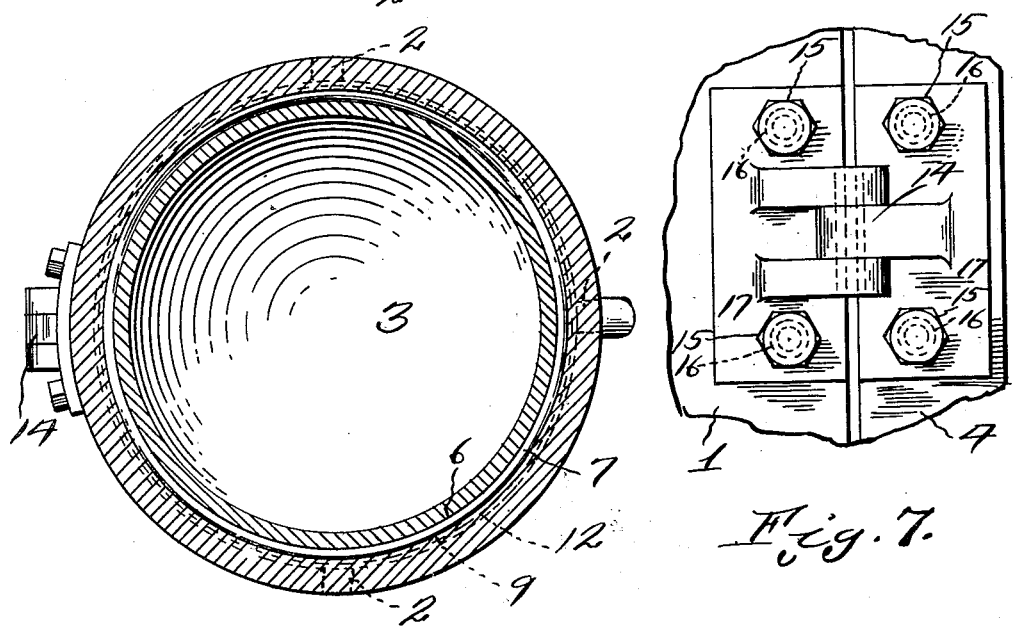
Fig. 6.
Fig. 7.
Inventor
Levi T. Pritchard
By Philip A. H. Purcell
Attorney Patented Jan. 6, 1953

2,624,488

UNITED STATES PATENT OFFICE 2,624,488

COVER FOR HIGH-PRESSURE VESSELS

Levi T. Pritchard, Tulsa, Okla., assignor to Dry Ice Converter Corporation, a corporation of Delaware Application November 7, 1947, Serial No. 784,575

1 Claim. (Cl. 220—46)

The invention relates to closures for high pressure vessels, for instance liquefiers, in which solid carbon dioxide is placed to be gasified for use in connection with beverages, and has for its object to provide a screw type closure, provided with means whereby pressure will be relieved from the receptacle to the atmosphere until the final seating of the closure, thereby obviating danger of blow out of the closure, incident to a limited number of thread engagement.

A further object is to provide the inner end of the closure with a circumferential bevelled seat cooperating with a similar seat on the receptacle end, and a gas compressed gasket which will further seal the joint at the seat; said seat preventing extrusion of part of the gasket between the parts, and at the same time limiting the compression of the gasket, consequently increasing the life of the gasket.

A further object is to dispose the gasket in a circumferential groove in the inner end of the closure with the outer diameter of the gasket greater than the inner diameter of the portion of the receptacle opening, so that, when the closure is screwed to closed position, the gasket will be inwardly contracted by engagement with the closure seat within the receptacle, and means whereby pressure will exhaust to the atmosphere during the closure screwing operation up to the time of the actual seating of the closure within the receptacle.

A further object is to mount the threaded closure in a hinged closure ring, and to provide the closure ring with slightly over-size thread so the closure will adjust itself to any mis-alinement of the axis of the receptacle and closure ring, and will materially reduce the amount of power necessary to rotate the heavy closure to open or closed position.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a front elevation of the closure.

Figure 2 is a top plan view of a portion of the receptacle and closure.

Figure 3 is a horizontal sectional view taken on line 3—3 of Figure 2, showing the closure in closed position.

Figure 4 is a view similar to Figure 3, showing the closure as it approaches its final closed position.

Figure 5 is a transverse sectional view taken on line 5—5 of Figure 2.

Figure 6 is a transverse sectional view taken on line 6—6 of Figure 2.

Figure 7 is a plan view of the hinge for the carrier ring.

The present invention is an improvement on the device shown in my application Serial No. 781,039, filed October 21, 1947, and is designed to render the same safe from closure blow-outs, incident to the building up of high pressure within the receptacle when a limited number of thread are interengaged with the thread in the receptacle mouth.

Referring to the drawings, the numeral 1 designates the high pressure receptacle in which solid carbon dioxide is placed. These receptacles are built to stand high pressure and are often seventeen feet long, and are used in batteries in a horizontal or inclined position. Large blocks of solid carbon dioxide are placed in these receptacles to sublime or gasify which requires considerable time, hence pressure is building up within the receptacle rapidly, therefore in any screw type closure it is necessary to get the closure in closed position rapidly to avoid blow-outs of the closure and injury to the operator. This happens when a limited number of thread are interengaged with the closure mouth and the pressure has built up within the receptacle. To obviate this difficulty, the mouth end of the receptacle is provided with one or more exhaust ports 2 through which pressure is exhausted to the atmosphere until the final sealing operation. The screw closure 3 is loosely threaded through the closure carrier ring 4, as shown in Figures 3 and 4.

The inner end of the closure 3 is reduced in diameter as shown at 5, and this reduced portion is provided with a circumferential gasket receiving groove 6, in which groove is disposed an annular compressible gasket 7. The gasket 7 has a greater outside diameter than the bore 8 within the mouth of the receptacle so that the gasket will be radially contracted by the bevelled ground seat 9 at the outer end of the bore 8, clearly shown in Figs. 4 and 3. The closure 3 is provided with a circumferential ground seat 10, which seats against the ground seat 9, thereby forming a tight engagement or joint through which portions of the gasket 7 will not be extruded by the pressure from the receptacle entering the channel 6, however the pressure entering the channel 6 will act on the gasket 7 for forming a seal, incident to compression of the gasket for preventing leakage between the seat members 9 and 10.

To open the receptacle the closure 3 is unscrewed and backed outwardly until the thread thereof are out of interengagement with the thread in the receptacle mouth, and at which time the closure can be swung to open position for the filling operation. After the receptacle has been filled, the closure is again rotated and threaded into the mouth, the over-size thread 11 of the carrier ring allowing quick operation and taking care of any misalignment. It will be noted that from the time the thread of the closure enter the thread of the receptacle mouth pressure will be exhausted to the atmosphere through ports 2 until the final turn for the sealing operation. When the gasket 7 engages the ground seat 9, said gasket will be contracted, and the final turn will seat seats 9 and 10; the further pressure built up within the receptacle will enter the gasket channel 6 and act on the gasket for the sealing operation. It will be noted however that there is an exhaust until sufficient thread are interengaged to prevent a blow-out of the closure, which will strip the thread on the closure or in the mouth, where a limited number are interengaged.

It will be noted that there is a limited compression of the gasket, hence the life of the gasket is materially increased. It will also be noted that there is not a grinding action on the gasket between mechanical parts, consequently the gasket will not become stuck or frozen to these parts and prevent retrograde movement or rotation of closure to open position.

It will be noted that the thread 12 in the mouth of the receptacle are separated from the seat 9 by an annular channel 13, hence it will be seen that any escaping gas will pass through the channel to any of the exhaust ports 2. The closure carrier ring 4 is connected to the receptacle 1 by means of a hinge 14, secured to the parts by bolts 15. The bolts extend through enlarged apertures 16 in the hinge leaves 17, therefore it will be seen that the ring 4 may be adjusted, circumferentially or longitudinally for properly adjusting the axis of the closure in relation to the axis of the receptacle.

From the above it will be seen that a closure is provided for a pressure vessel which is simple in construction, one which eliminates the danger of blow-outs, and one which will exhaust to the atmosphere until the closure is about to finally seat.

The invention having been set forth what is claimed as new and useful is:

A pressure vessel seal for a closure extending into the open end of a pressure vessel, said closure having a seat cooperating with a seat within the vessel, a circumferential gasket channel carried by the inner end of the closure in advance of the seat thereon, said channel being rectangular in transverse cross section, an annular gasket round in cross section within said channel the outer side of which is in the path of the seat within the vessel when the closure is moved towards closed position whereby said gasket will roll over the seat and be contracted as said closure is seated, said channel being wider than the width of the gasket whereby a rolling action of the gasket is obtained when the gasket is forced over the receptacle seat and to the inside of the receptacle seat.

LEVI T. PRITCHARD.

REFERENCES CITED

The following references are of record in the file of this patent:

UNITED STATES PATENTS

| Number | Name | Date |
|---|---|---|
| 588,800 | Livingston | Aug. 24, 1897 |
| 766,778 | Stubbers | Aug. 2, 1904 |
| 969,926 | Wightman | Sept. 13, 1910 |
| 1,431,123 | Maurer, Jr. | Oct. 3, 1922 |
| 1,515,661 | Cross | Nov. 18, 1924 |
| 1,838,636 | Reid | Dec. 29, 1931 |
| 2,015,761 | Muro | Oct. 1, 1935 |
| 2,389,824 | Smith | Nov. 27, 1945 |
| 2,435,913 | Wall | Feb. 10, 1948 |
| 2,436,407 | Stephens | Feb. 24, 1948 |